Patented June 21, 1932

1,863,903

UNITED STATES PATENT OFFICE

ROY W. JOHNS, OF CHICAGO, ILLINOIS, ASSIGNOR TO SWIFT AND COMPANY, OF CHICAGO, ILLINOIS, A CORPORATION OF ILLINOIS

METHOD OF BRANDING EDIBLE ANIMAL CARCASSES

No Drawing.   Application filed December 16, 1930. Serial No. 502,869.

My invention relates to methods of branding edible animal carcasses.

One of the objects of my invention is to provide a new technique whereby the fatty surface of edible animal carcasses may be branded in which smearing may be eliminated.

It has been proposed to brand edible animal carcasses by printing characters on the surface. It has also been proposed by Mr. McKee in his co-pending application entitled Method and means of marking meat, filed December 21, 1929, Serial Number 415,838, to deposit a coloring substance on the walls in depressions formed on the surface of a carcass.

It must be borne in mind in this connection that the surface of edible animal carcasses, as in the case of cattle or sheep after the hide has been removed, and in the case of swine after the hair or skin has been removed, presents a fatty, oily surface which does not lend itself to surface printing. Some of the facts are substantially liquid at ordinary temperatures and many of the fats will liquefy upon the application of a warm, human hand. It will be readily seen that pigment deposited upon the surface will tend to smear as a result of the movement of the liquid fats or oils which serve as a vehicle. The fat cells, or the cells in the fatty tissue, have proteid walls. It is known that certain stains react with proteid animal tissue which do not react with fats. For instance, such tissue is colored when subjected to the action of such reagents as sulphuric acid, silver nitrate, nitric acid, iodine, osmic acid, and potassium permanganate.

There are numerous chemicals which are well-known which will react with tissue to give a color which will contrast with the surface of an edible animal carcass. By so coloring the tissue rather than by applying a pigment, a character placed upon the surface of a carcass becomes fixed inasmuch as the tissue remains fixed.

My invention does not involve the mere application of a pigment but involves the change in color of the unfatty tissue by any appropriate means.

I claim:

The method of branding adipose of fat of edible animal carcasses which consists of applying the mark thereto by a reagent, such as nitric or sulphuric acid, which changes the color of the tissue or walls of the fat cells only, said mark penetrating the surface to a depth to cause the reagent to act upon the walls of the fat cells of the tissue and change the color thereof.

Signed at Chicago, Illinois, this 13th day of December, A. D. 1930.

ROY W. JOHNS.